United States Patent Office 2,694,697
Patented Nov. 16, 1954

2,694,697

INTERPOLYMERIZATION OF MALEIC ANHYDRIDE AND VINYL ISOBUTYL ETHER

Frederick Grosser, North Plainfield, N. J., assignor to General Aniline & Film Corporation, New York, N. Y., a corporation of Delaware No Drawing. Application December 29, 1951, Serial No. 264,260

15 Claims. (Cl. 260—78.5)

This invention relates to a method of producing copolymers of maleic anhydride and vinyl isobutyl ether, and more particularly to the production of partially hydrolyzed copolymers having desirable solubility characteristics.

Maleic anhydride and vinyl isobutyl ether in a suitable solvent such as acetone or the like, may be made to interpolymerize in well known manner by means of an organic peroxide catalyst and heat, to form a copolymer which remains dissolved in the solvent. The resulting copolymer, after precipitation from solution and drying, is a white powder which while useful for many purposes, has solubility properties which reduce its value in certain applications. For example, for use as an anti-halation layer on photographic film, the polymer must be quite soluble in lower alkyl alcohols, such as methyl, ethyl and isopropyl alcohol, so that it can be coated on the film base from alcoholic solution. It must be substantially insoluble in water, employed in washing and other steps, but soluble in aqueous alkaline solutions so that it will readily strip from the film in the developer.

In order to produce a copolymer with the aforementioned solubility properties, it has been customary to subject the copolymer, while still in the polymerization solvent solution, to a partial hydrolysis of the anhydride groups therein. This partial hydrolysis has been carried out heretofore by the gradual addition to the agitated polymer solution, of about 20 moles of water per mole of maleic anhydride over a period of about 5 to 6 hours. This partially hydrolyzed copolymer is still soluble in the diluted solvent. However, during the hydrolysis step, the water must be added carefully and gradually, for if it is added too rapidly, precipitation of the polymer occurs and resolution takes place quite slowly thereafter. The partially hydrolyzed copolymer may be precipitated from solution by the addition of a large excess of water, and after filtration and drying is recovered as a white shredded solid.

It is an object of this invention to provide a process for producing the aforementioned partially hydrolyzed copolymers which is simpler, faster and more efficient than the method heretofore employed. It is another object to provide an improved partially hydrolyzed maleic anhydride-vinyl isobutyl ether by way of an improved method. Other objects and advantages will appear as the description proceeds.

These objects are attained by the instant invention, which comprises carrying out the partial hydrolysis by the addition to the copolymer solution, of only about 1 mole of water per mole of maleic anhydride, as rapidly as desired. It has been found that hydrolysis in this manner produces a copolymer with solubility properties equal or better than those of the copolymers hydrolyzed in the manner heretofore employed. The slightly lower degree of hydrolysis of the copolymer produced in accordance with this invention tends to improve its solubility in alcohol without reducing its solubility in aqueous alkaline solutions or increasing its water solubility to any great extent. The process of the invention has the advantage of cutting the total reaction time in half. The relatively small quantity of water may be added all at once and as rapidly as desired without danger of premature precipitation occurring.

The polymerization conditions with respect to temperature, duration and the like are those which have been heretofore employed. The organic peroxides which may be employed as catalyst include lauroyl peroxide, benzoyl peroxide, ditertiary butyl peroxide and the like. The reactants are usually present in approximately equimolar amounts, although a slight excess of the vinyl isobutyl ether may be employed. Solvents should be employed, such as acetone and the like, which are water-soluble and have boiling points at about the desired polymerization temperature which may range from about 30° to 85° C. The water-solubility property enables the homogeneity of the reaction mixture to be maintained during the subsequent addition of water for hydrolysis and the separation steps thereafter, while the boiling point property enables better temperature control of the polymerization reaction.

In general, to obtain a copolymer with the desired properties, the hydrolysis is carried out by heating the solution at temperatures above about 30° C. and preferably at reflux temperature for from about ½ to 1½ hours after the water for hydrolysis has been added.

The following examples are illustrative of the invention and are not to be regarded as limitative. Parts are by weight unless otherwise indicated.

*Example 1*

Into a suitable reactor equipped with agitator, reflux condenser and thermometer was charged 105 parts vinyl isobutyl ether
98 parts maleic anhydride
530 parts acetone
1 part lauroyl peroxide The mixture was heated, with agitation, to the boiling point and held at reflux temperature for five hours. Then 18 parts $H_2O$ was added and agitation and reflux were maintained for 1 hour longer. The polymer was then precipitated by running the solution in a thin stream into a large excess of rapidly agitated water. The white, fibrous precipitate was dried at 50° C. in vacuo.

The resulting partially hydrolyzed copolymer had a relative viscosity of 7.8 when measured in a 5% solution ethanol at 25° C. in an Ostwald-Fenske viscosimeter. It dissolved rapidly in aqueous alkaline developer, pH 7.5–9.0. Its solubility, in grams per 100 ml. at 25° C. was 19.5 in ethanol and 0.05 in water.

*Example 2*

Into a two-liter, three-neck flask fitted with stirrer, reflux condenser and thermometer were charged:

98 g. (1 mol) maleic anhydride
111 g. (1.11 mol) vinyl isobutyl ether
535 g. acetone
1.0 g. lauroyl peroxide The mixture was heated, with agitation, to reflux in about 15 minutes, and agitation and refluxing maintained for 5 hours. Then 20 g. of water were added in about 10 minutes and agitation and refluxing maintained for an additional hour. The polymer was precipitated by adding the resulting solution in a thin stream to about 15 gallons of rapidly agitated water. The white shredded partially hydrolyzed polymer was separated out and dried in vacuo at 50°–60° C. for 16 hours. Its properties were similar to those of Example 1.

Various modifications and variations of this invention will be obvious to persons skilled in the art, and it is understood that such modifications are to be included within the purview of this application and the spirit and scope of the appended claims.

I claim:

1. A process comprising adding to a maleic anhydride-vinyl isobutyl ether copolymer solution in a water soluble inert organic solvent having a boiling point of from about 30° to 85° C., 1 mole of water per mole of anhydride, and heating the solution to partially hydrolyze the copolymer.

2. The process of claim 1 in which the organic solvent is acetone.

3. A process as defined in claim 2 wherein said copolymer solution is obtained by copolymerizing the maleic anhydride and vinyl isobutyl ether in the presence of an organic peroxide catalyst.

4. A process as defined in claim 3 wherein said catalyst is lauroyl peroxide.

5. The process of claim 1 in which the said heating step is carried out at reflux temperature.

6. The process of claim 1 in which the said heating step is conducted at a temperature of about 30° to 85° C.

7. A process comprising adding to a maleic anhydride-vinyl isobutyl ether copolymer solution in a water-soluble inert organic solvent having a boiling point of from about 30° to 85° C., 1 mole of water per mole of anhydride, and heating the solution at from about 30° to 85° C. for about ½ to 1½ hours to partially hydrolyze the copolymer.

8. A process as defined in claim 1 wherein said copolymer solution is obtained by copolymerizing the maleic anhydride and vinyl isobutyl ether in the presence of an organic peroxide catalyst.

9. A process as defined in claim 8 wherein said catalyst is lauroyl peroxide.

10. The process of claim 7 in which the said heating step is conducted at reflux temperatures.

11. The process of claim 10 in which the solvent is acetone.

12. A process as defined in claim 11 wherein said copolymer solution is obtained by copolymerizing the maleic anhydride and vinyl isobutyl ether in the presence of an organic peroxide catalyst.

13. A process as defined in claim 12 wherein said catalyst is lauroyl peroxide.

14. A process as defined in claim 7 wherein said copolymer solution is obtained by copolymerizing the maleic anhydride and vinyl isobutyl ether in the presence of an organic peroxide catalyst.

15. A process as defined in claim 14 wherein said catalyst is lauroyl peroxide.

References Cited in the file of this patent

UNITED STATES PATENTS

| Number | Name | Date |
|---|---|---|
| 2,066,105 | Hagedorn et al. | Dec. 29, 1936 |
| 2,565,147 | Pfluger | Aug. 21, 1951 |